(12) United States Patent
Gould et al.

(10) Patent No.: US 10,561,004 B2
(45) Date of Patent: Feb. 11, 2020

(54) HOME AUTOMATION SYSTEM INCLUDING LIGHT DIMMER OPERATION BASED UPON A SEQUENCE OF PARTIAL DIMMING COMMANDS AND RELATED METHODS

(71) Applicant: K4CONNECT INC., Raleigh, NC (US)

(72) Inventors: Jonathan Andrew Gould, Raleigh, NC (US); Michael Scott Althoff, Hillsborough, NC (US)

(73) Assignee: K4CONNECT INC., Raleigh, NC (US)

( * ) Notice: Subject to any disclaimer, the term of this patent is extended or adjusted under 35 U.S.C. 154(b) by 0 days.

(21) Appl. No.: 16/176,224

(22) Filed: Oct. 31, 2018

(65) Prior Publication Data

US 2019/0182936 A1 Jun. 13, 2019

Related U.S. Application Data

(60) Provisional application No. 62/597,018, filed on Dec. 11, 2017.

(51) Int. Cl.
*H05B 37/02* (2006.01)
*H04L 29/08* (2006.01)
*H04L 12/28* (2006.01)

(52) U.S. Cl.
CPC ..... *H05B 37/0272* (2013.01); *H04L 12/2816* (2013.01); *H04L 67/10* (2013.01); *H04L 67/12* (2013.01)

(58) Field of Classification Search
None
See application file for complete search history.

(56) References Cited

U.S. PATENT DOCUMENTS 9,854,653 B1 * 12/2017 Ackmann .......... H05B 37/0272
2008/0074059 A1 * 3/2008 Ahmed .............. H05B 37/0218
                                                                    315/291
2009/0085497 A1 * 4/2009 Osborn .................. E04D 13/03
                                                                    315/294
2009/0086485 A1 * 4/2009 Osborn ............... F21V 23/0435
                                                                    362/240

(Continued)

OTHER PUBLICATIONS

Patrick Moorhead, The Problem With Home Automation's Internet of Things (IoT), Forbes, Sep. 26, 2013.

*Primary Examiner* — Crystal L Hammond
(74) *Attorney, Agent, or Firm* — Allen, Dyer, Doppelt + Gilchrist, P.A. Attorneys at Law

(57) ABSTRACT

A home automation (HA) system may include HA operation devices within a structure. At least one of the HA operation devices may include a light dimmer for a given area. The HA system may also include HA user interface devices for respective users within the structure. Each HA user interface device may be configured to wirelessly communicate with at least one of the HA operation devices. A HA hub device within the structure may provide communications for the HA user interface and operation devices. The HA hub device may receive a light-off command from an HA user interface device for the light dimmer and send a sequence of partial dimming commands to the light dimmer to turn the light off, and determine whether the given area is occupied based upon at least one HA operation device, and when occupied, then send a light-on override command to the light dimmer.

18 Claims, 3 Drawing Sheets

(56) References Cited

U.S. PATENT DOCUMENTS

| | | | |
|---|---|---|---|
| 2011/0298302 A1* | 12/2011 | Pitigoi-Aron | H01H 9/00 307/125 |
| 2015/0301544 A1* | 10/2015 | Lonvick | G05B 15/02 700/297 |
| 2015/0382435 A1* | 12/2015 | Noesner | H05B 37/0272 315/158 |
| 2016/0132031 A1* | 5/2016 | Kozura | H04L 12/2816 700/275 |
| 2016/0169454 A1* | 6/2016 | Moon | F21K 9/232 362/221 |
| 2017/0006533 A1 | 1/2017 | Gould et al. | |
| 2017/0045626 A1* | 2/2017 | Hartman | G08G 1/087 |

* cited by examiner

HOME AUTOMATION SYSTEM INCLUDING LIGHT DIMMER OPERATION BASED UPON A SEQUENCE OF PARTIAL DIMMING COMMANDS AND RELATED METHODS

RELATED APPLICATION

The present application is based upon provisional application Ser. No. 62/597,018, filed Dec. 11, 2017, the entire contents of which is hereby incorporated by reference.

TECHNICAL FIELD

The present embodiments are directed to the field of electronics, and more particularly to home automation systems and related methods.

BACKGROUND

There are a number of home automation systems and approaches that seek to permit automated control of electrical devices in a house. The popularity of home automation has been increasing due to the greater availability of smartphones and tablets. As noted in "The Problem With Home Automation's Internet Of Things (IoT)", an article appearing in Forbes dated Sep. 26, 2013, home automation was typically for wealthy consumers with an expensive system to control lights, home theater, security, air conditioning, and home audio. This market has expanded with many do it yourself (DIY) products now available, and, although the products are useful, they may be difficult to aggregate. In other words, as explained in the article, difficulties could arise if a consumer bought a Nest thermostat, Kwikset door lock, Phillips Hue lighting device, Lutron light switch, Sonos audio system, and Belkin wireless plugs. The consumer would need to have multiple applications each requiring time to setup, learn, and use. Additionally, the article states that there is no easy way to make devices work together, such as if the consumer wanted to trigger one event using one device based on another event from another device.

Multiple communication protocols may also be problematic. In particular, different devices may operate using different communication protocols, for example, Wifi, Zigbee, Zwave, Insteon, Itron, RadioRA2, and others. This may create additional difficulties for home automation.

One approach to address these shortcomings is for the consumer, which may include a user and/or enterprise, to use a service and device aggregator that provides one application and a consolidated wireless adapter unit. The user would contract with such a provider for multiple years. Unfortunately, as noted in the article, the consumer may not benefit from the most advanced hardware and software.

Another approach, as noted in the Forbes article, is to provide a single application that attempts to consolidate disparate applications and consolidate wireless adaptors, for example, using each of the different communications protocols. However, such aggregation or single application approaches may present increased difficulty in usability. For example, if a given user cannot readily operate the one application or if the application is not readily accessible for any given user, operational difficulties may still exist. Moreover, as home automation systems become more ubiquitous, for example, as a result of the number of operable devices increases and the integration of the these devices becomes more seamless, operational conflicts may occur. For example, multiple users may attempt to control a single device with conflicting instructions. Accordingly, further improvements to the operation of home automation devices may be desirable.

SUMMARY

A home automation (HA) system may include a plurality of HA operation devices within a structure. At least one of the plurality of HA operation devices may include a light dimmer for a given area. The HA system may also include a plurality of HA user interface devices for respective users within the structure. Each HA user interface device may be configured to wirelessly communicate with at least one of the plurality of HA operation devices. The HA system may also include at least one HA hub device within the structure to provide communications for the plurality of HA user interface devices and the plurality of HA operation devices. The at least one HA hub device may be configured to receive a light-off command from an HA user interface device for the light dimmer and send a sequence of partial dimming commands to the light dimmer to turn the light off. The at least one HA hub device may also be configured to determine whether the given area is occupied based upon at least one HA operation device, and when occupied, then send a light-on override command to the light dimmer.

The at least one HA hub device may be configured to send a light-on override command to the light dimmer based upon at least one other HA operation device after sending the partial dimming command, for example. The plurality of HA user interface devices may include a plurality of HA user interface tablet computers.

The HA system may further include a cloud server configured to provide communications among the plurality of HA operation devices, the plurality of HA user interface devices, and the at least one HA hub device. The plurality of HA operation devices may include a plurality of Internet of Things (IoT) devices, for example. The sequence of partial dimming commands comprises a 50% dimming command and a 25% dimming command, for example.

The sequence of partial dimming commands may extend over at least 10 seconds. The structure may include a senior living facility, for example.

A method aspect is directed to a method of operating a light dimmer for a given area in an HA system that includes a plurality of HA operation devices within a structure, wherein at least one of the plurality of HA operation devices includes the light dimmer, a plurality of HA user interface devices for respective users within the structure, wherein each HA user interface device is configured to wirelessly communicate with at least one of the plurality of HA operation devices, and at least one HA hub device within the structure to provide communications for the plurality of HA user interface devices and the plurality of HA operation devices. The method may include using the at least one HA hub device to receive a light-off command from an HA user interface device for the light dimmer and send a sequence of partial dimming commands to the light dimmer to turn the light off, and determine whether the given area is occupied based upon at least One HA operation device, and when occupied, then send a light-on override command to the light dimmer.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
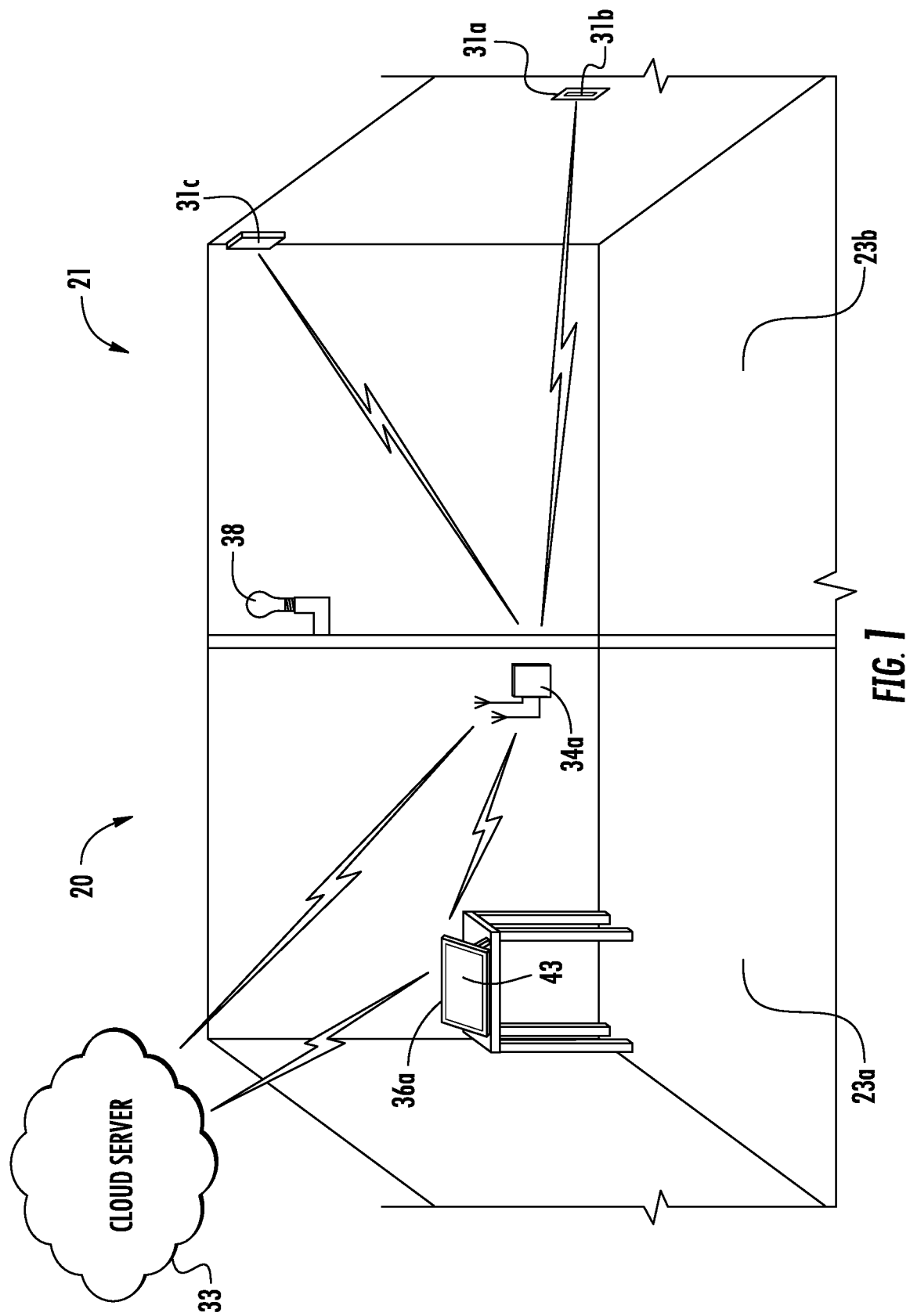
FIG. 1 is a diagram of a structure including an HA system according to an embodiment.
Figure 2:
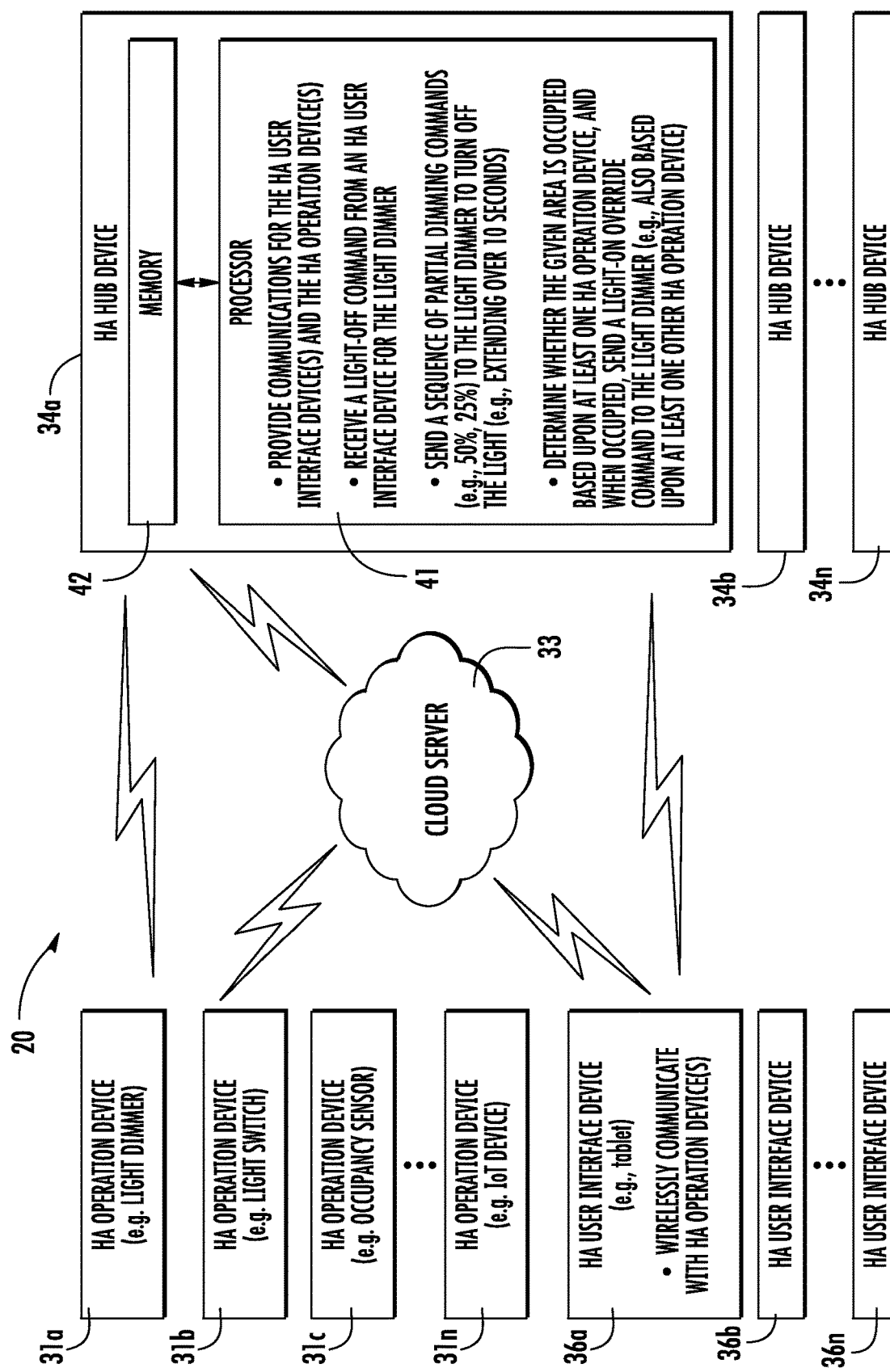
FIG. 2 is a schematic diagram of the HA system of FIG. 1.

Referring initially to FIGS. 1 and 2, a home automation (HA) system 20 illustratively includes a cloud server 33. The cloud server 33 may store media content for distribution, for example, documents, photos, videos, data feeds, etc. The cloud server 33 may also process operations for HA devices. The cloud server 33 may also function as a gateway to permit operation of HA operation devices 31a-31n from outside a structure 21 or internal network (i.e., over the Internet).

The HA operation devices 31a-31n of the HA system 20 are within the structure 21. The structure 21 may be a senior living facility, for example, and include living rooms for members of the senior living facility. Of course, the structure 21 may be another type of structure, for example, a hospital, a home, a commercial, residential, and/or educational campus, etc.

The HA operation devices 31a-31n include a light dimmer 31a in a second room 23b for controlling a light 38 in the second room 23b, for example, of the senior living facility 21. The HA operation devices 31a-31n may also include a light switch 31b in the room in the structure 21, a thermostat, a motion detector, an occupancy detector 31c, an audio controller, a door lock, and a camera, for example. The HA operation devices 31a-31n may include other and/or additional types of devices.

The HA system 20 also includes HA user interface devices 36a-36n for respective users within the structure 21. The HA user interface devices 36a-36n may be in the form of tablet computers, for example. Each HA user interface device 36a-36n may be another or different type of HA user interface device, for example, a smartphone, a laptop or personal computer, and/or television interface or streaming device.

Each HA user interface device 36a-36n is configured to wirelessly communicate with at least one of the HA operation devices 31a-31n to perform at least one HA operation. For example, a given HA user interface device 36a may be used, based upon input thereto, to control the light dimmer 31a to thus control a dimmable operation of a light 38, and/or a light switch 31b to also control the light.

In the exemplary embodiment where an HA user interface device 36a-36n is in the form of a tablet computer, the HA user interface device may include a display 43, which may be in the form of a touch display permitting a user to control operation of one of the HA operation devices 31a-31n through interaction therewith. It should be understood that in some embodiments, the HA user interface devices 36a-36n may not include a touch display, but rather a physically separated display and an input device, such as, for example, a pushbutton. Each HA user interface device 36a-36n may also be used for social media, playing games, and/or surfing the Internet. Each HA user interface device 36a-36n may also provide stored media content to the respective user for listening and/or viewing on a display 43. In the example of a senior living facility, the stored media content may include current weather data, a social calendar, a daily food menu for the cafeteria, photos and/or video from a current event, local and national news, etc. Of course, each HA user interface device 36a-36n may be used to perform other and/or additional functions within the HA system 20.

The HA system 20 further includes HA hub devices 34a-34n within the structure or senior living facility 21. Each HA hub device 34a-34n includes a processor 41 and memory 42 coupled thereto. While functions or operations of the HA hub devices are described herein, it should be noted that these functions are performed by the processor 41 cooperating with the memory 42. The HA hub devices 34a-34n provide communications for the cloud server 33, the HA user interface devices 36a-36n, and the HA operation devices 31a-31n. More particularly, a respective HA hub device 34a-34n may be in each area of the structure 21 and communicate with a corresponding HA user interface device 36a-36n. With respect to the senior living facility example noted above, each member of the senior living facility may have an HA user interface device 36a-36n and an HA hub device 34a-34n within their room. The HA user interface device 36a-36n may communicate with the HA hub device 34a-34n to control respective HA operation devices 31a-31n. The HA hub device 34a-34n may be considered a bridge between respective HA operation devices 31a-31n and the corresponding HA user interface device 36a-36n.

An HA user interface device 36a-36n may communicate with the cloud server 33 to retrieve updated data or media content from the Internet, for example, or upload to the cloud server. Of course, the HA user interface device 36a-36n may communicate with either or both of the corresponding HA hub device 34a-34n and cloud server 33 to download or retrieve data and/or media. The HA user interface device 36a-36n may also upload data, for example, to the cloud server 33. With respect to the senior living facility example, the HA user interface device 36a-36n may upload or communicate usage data and/or other data, for example, cognitive data to be used by staff for determining a user health level and/or a user activity level. Further details of an exemplary HA system are described in U.S. Patent Application Publication No. 2017/0006533, assigned to the present assignee, and the entire contents of which are herein incorporated by reference.

Figure 3:
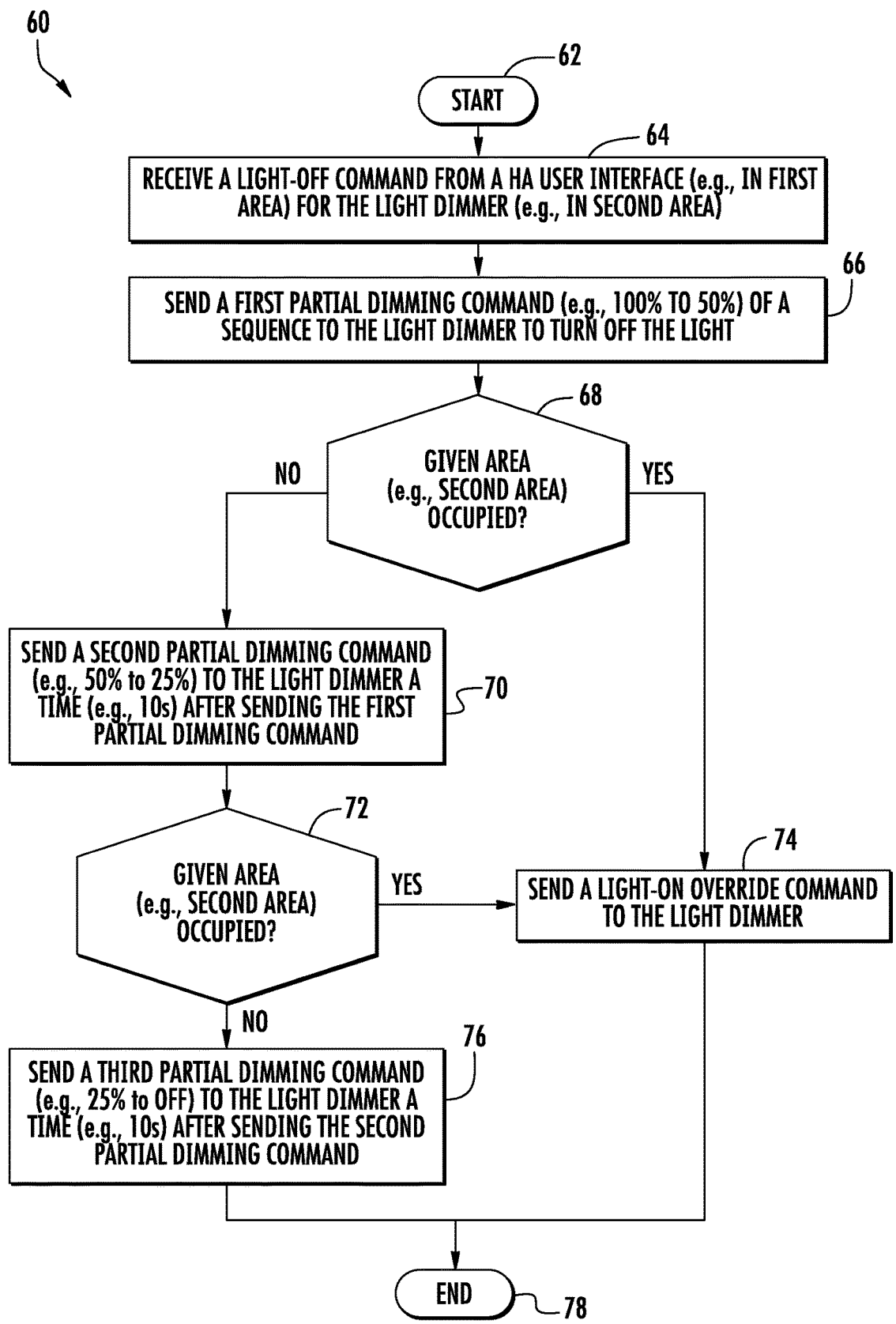
FIG. 3 is a flow diagram illustrating operation of the HA system according to an embodiment.

Referring now to the flowchart 60 in FIG. 3, beginning at Block 62, further details of exemplary operation of an HA hub device 34a will now be described. At Block 64, the HA hub device 34a receives a light-off command from a corresponding HA user interface device 36a in a first area 23a for a light dimmer 31a in a given or second area 23b. While the corresponding HA user interface device 36a may be in the first area 23a or remote from the light 38 to be turned off, it may be in the same room or area. For example, the HA user interface device 36a may be in a living room of living quarters in the senior living facility 21 while the light 38 to be controlled may be in a bathroom of those living quarters. It should be noted that the light dimmer 31a is electrically coupled to the light 38 to be controlled and need not be physically in the same housing or physical location as the light. For example, the light dimmer 31a may be carried in a light bulb housing of the light 38, a common housing with the light switch 31b, or be a standalone device.

At Blocks 66, 70, 76, the HA hub device 34a sends, based upon the light-off command, a sequence of partial dimming commands to the light dimmer 31a to turn the light 38 off. More particularly, the HA hub device 34a sends, for example, wirelessly, a first partial dimming command of the sequence, to the light dimmer 31a (Block 66) that causes the light dimmer 31a to dim the light 38 from 100% to 50%, for example. Of course, the first partial dimming command may cause the light 38 to dim from and to other levels, for example, from any level greater than 50% to 50%, to 60%, etc. The HA hub device 34a sends, for example, wirelessly, a second partial dimming command of the sequence, to the light dimmer 31a (Block 70) that causes the light dimmer 31a to dim the light 38 from 50% to 25%, for example. Of course, the first partial dimming command may cause the light 38 to dim from and to other levels. A third partial dimming command of the sequence (Block 74) may turn the light 38 off by dimming the light from 25% to off. While three partial dimming commands have been described in the sequence, it will be appreciated by those skilled in the art that there may be any number of partial dimming commands greater than or equal to two.

The HA hub device 34a may wait or delay a predetermined time period between sending of the partial dimming commands, for example, 10 seconds. The time period between sending of the partial dimming commands may be another time and/or may be variable, for example, reducing between partial dimming commands and/or may be user adjustable.

At Block 68, after sending the first partial dimming command of the sequence at Block 66, the HA hub device 34a determines whether the given area 23b is occupied based upon at least one HA operation device 31a-31n. More particularly, the HA hub device 34a may determine whether the given area 23b is occupied based upon an occupancy detector 31c in the given area. The HA hub device 34a may alternatively or additionally determine whether the given area 23b is occupied based upon operation of the light switch 31b in the given or second area and/or other operation devices within the given or second area. Other HA operation devices 31a-31n may be used as a basis for determining occupancy. Additionally, HA user interface devices 36a-36n may be used to determine occupancy. For example, geolocation techniques may be used to determine whether the given HA user interface device 36a (e.g., generating the light-off command), is in the same room or area as the light 38 to be operated or turned off.

If, at Block 68, the given area is occupied, the HA hub device 34a sends, for example, wirelessly, a light-on override command to the light dimmer 31a (Block 74). In other words, if the given area 23b is occupied, the light 38 will not dim further or turn off and will turn to a full-on or original level thus overriding the light-off command. This may be particularly advantageous in the above-described example where the living quarters are shared by multiple members or users. For example, a first member or user may be in the bathroom with the lights on, and a second member may notice the bathroom lights are on, but fail to notice the first member is in the bathroom. The second member may thus, using the HA user interface device 36a, attempt to turn off the light 38 in the bathroom. Since the occupancy detector 31c would detect the first member's presence, the light 38 would not be turned off.

At any time during the process, i.e., after any of the partial dimming commands of the sequence has been sent by the HA hub device 34a, and/or a time after (e.g. a short time) the light 38 has turned off, if the HA hub device determines that the given area is occupied (e.g., Blocks 68, 72) or becomes occupied, the HA hub device sends, for example, wirelessly, the light-on override command to the light dimmer 31a (Block 74). For example, in one exemplary senior living facility implementation, the first member may be relatively still in the bathroom (i.e., little or no movement). After the light 38 dims based upon the first partial dimming command of the sequence, the first member may wave his or her arms to "trip" the occupancy detector 31c to return the light to the full-on position or the originally set level. The first member may take other and/or additional actions to cause the HA hub device 34a to determine the given area 23b is occupied and send the light-on override command. For example, the first member may press the light switch 31b in the bathroom. Of course, other and/or additional HA operation devices 31a-31n may cooperate with the HA hub device 34a for determining when the given area is occupied. In other words, detected occupancy by the HA hub device 34a serves as an interrupt and may return the light 38 to the originally set level or full-on. This may prevent the first member from being left in darkness, thus reducing potential safety hazards for the first member. The method ends at Block 78.

While the HA system 20 has been described with respect to operations of an HA hub device 34a, it should be appreciated by those skilled in the art that the operations of the HA hub device may be performed at the cloud server 33 instead, and/or shared between the cloud server and the HA hub device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A home automation (HA) system comprising:
   a plurality of HA operation devices within a structure, at least one of the plurality of HA operation devices comprising a light dimmer for a first area;
   a plurality of HA user interface devices for respective users within the structure, each HA user interface device configured to wirelessly communicate with at least one of the plurality of HA operation devices; and
   at least one HA hub device within the structure to provide communications for the plurality of HA user interface devices and the plurality of HA operation devices and configured to
      receive a light-off command from an HA user interface device within a second area for the light dimmer and send a sequence of partial dimming commands over at least 10 seconds to the light dimmer to turn the light off, and
      determine whether the given area is occupied based upon at least one HA operation device, and when occupied, then send a light-on override command to the light dimmer.

2. The HA system of claim 1 wherein the at least one HA hub device is configured to send a light-on override command to the light dimmer based upon at least one other HA operation device after sending the partial dimming command.

3. The HA system of claim 1 wherein the plurality of HA user interface devices comprises a plurality of HA user interface tablet computers.

4. The HA system of claim 1 further comprising a cloud server configured to provide communications among the plurality of HA operation devices, the plurality of HA user interface devices, and the at least one HA hub device.

5. The HA system of claim 1 wherein the plurality of HA operation devices comprises a plurality of Internet of Things (IoT) devices.

6. The HA system of claim 1 wherein the sequence of partial dimming commands comprises a 50% dimming command and a 25% dimming command.

7. The HA system of claim 1 wherein the structure comprises a senior living facility.

8. A home automation (HA) hub device from among a plurality thereof for an HA system comprising a plurality of HA operation devices within a structure, at least one of the plurality of HA operation devices comprising a light dimmer for a first area, and a plurality of HA user interface devices for respective users within the structure, each HA user interface device configured to wirelessly communicate with at least one of the plurality of HA operation devices to perform at least one HA operation, the HA hub device being within the structure and comprising:
 a processor and a memory coupled thereto, the processor configured to
  receive a light-off command from an HA user interface device within a second area for the light dimmer and send a sequence of partial dimming commands extending over at least 10 seconds to the light dimmer to turn the light off, and
  determine whether the given area is occupied based upon at least one HA operation device, and when occupied, then send a light-on override command to the light dimmer.

9. The HA hub device of claim 8 wherein the processor is configured to send a light-on override command to the light dimmer based upon at least one other HA operation device after sending the partial dimming command.

10. The HA hub device of claim 8 wherein the plurality of HA user interface devices comprises a plurality of HA user interface tablet computers.

11. The HA hub device of claim 8 wherein the plurality of HA operation devices comprises a plurality of Internet of Things (IoT) devices.

12. The HA hub device of claim 8 wherein the sequence of partial dimming commands comprises a 50% dimming command and a 25% dimming command.

13. The HA hub device of claim 8 wherein the structure comprises a senior living facility.

14. A method of operating a light dimmer for a first area in a home automation (HA) system comprising a plurality of HA operation devices within a structure, at least one of the plurality of HA operation devices comprising the light dimmer, a plurality of HA user interface devices for respective users within the structure, each HA user interface device configured to wirelessly communicate with at least one of the plurality of HA operation devices, and at least one HA hub device within the structure to provide communications for the plurality of HA user interface devices and the plurality of HA operation devices, the method comprising:
 using the at least one HA hub device to
  receive a light-off command from an HA user interface device within a second area for the light dimmer and send a sequence of partial dimming commands extending over at least 10 seconds to the light dimmer to turn the light off, and
  determine whether the given area is occupied based upon at least one HA operation device, and when occupied, then send a light-on override command to the light dimmer.

15. The method of claim 14 wherein the at least one HA hub device is used to send a light-on override command to the light dimmer based upon at least one other HA operation device after sending the partial dimming command.

16. The method of claim 14 wherein the plurality of HA user interface devices comprises a plurality of HA user interface tablet computers.

17. The method of claim 14 wherein the plurality of HA operation devices comprises a plurality of Internet of Things (IoT) devices.

18. The method of claim 14 wherein the sequence of partial dimming commands comprises a 50% dimming command and a 25% dimming command.

\* \* \* \* \*